UNITED STATES PATENT OFFICE.

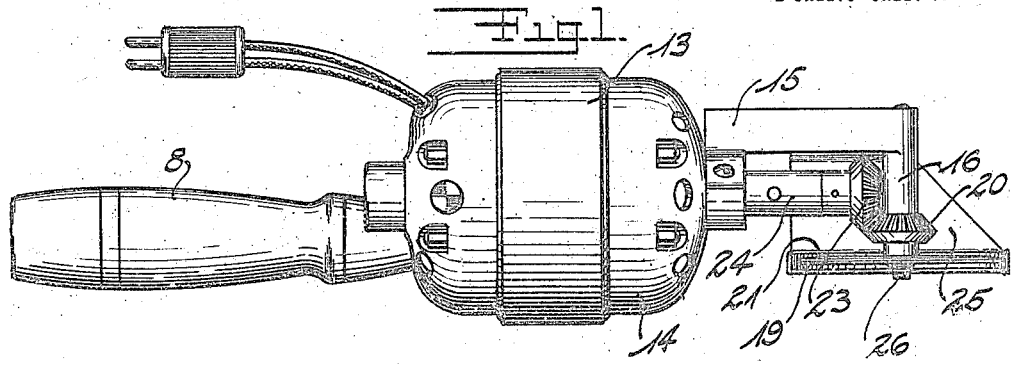
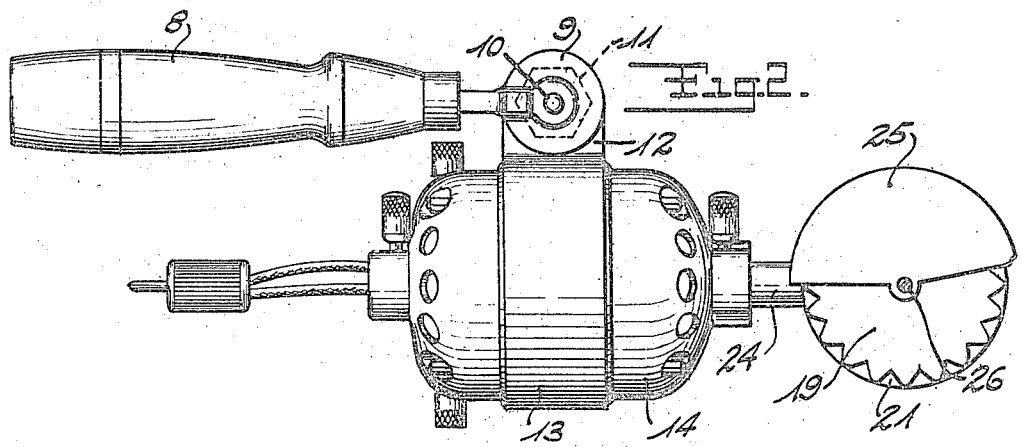
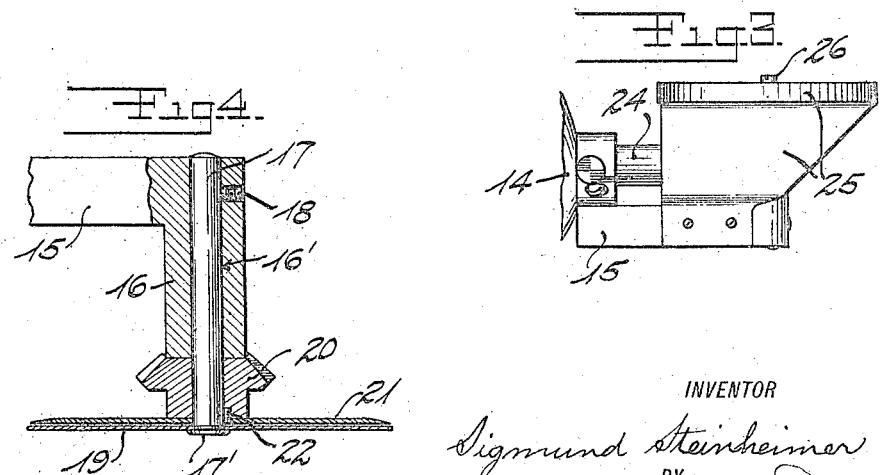

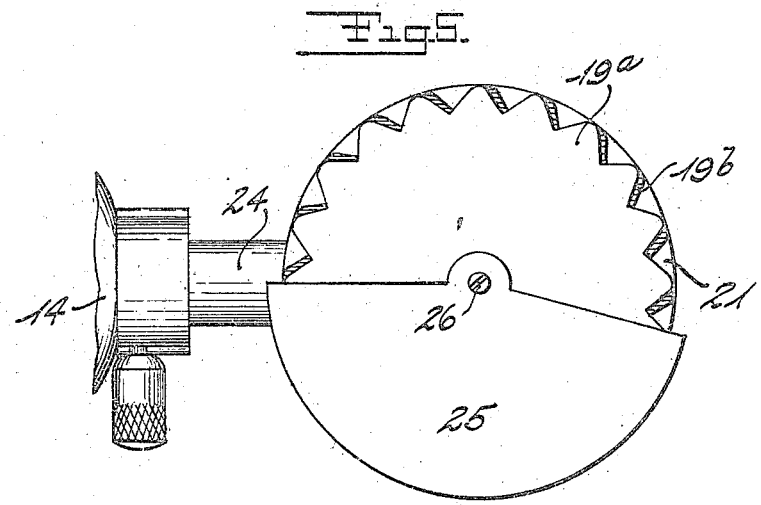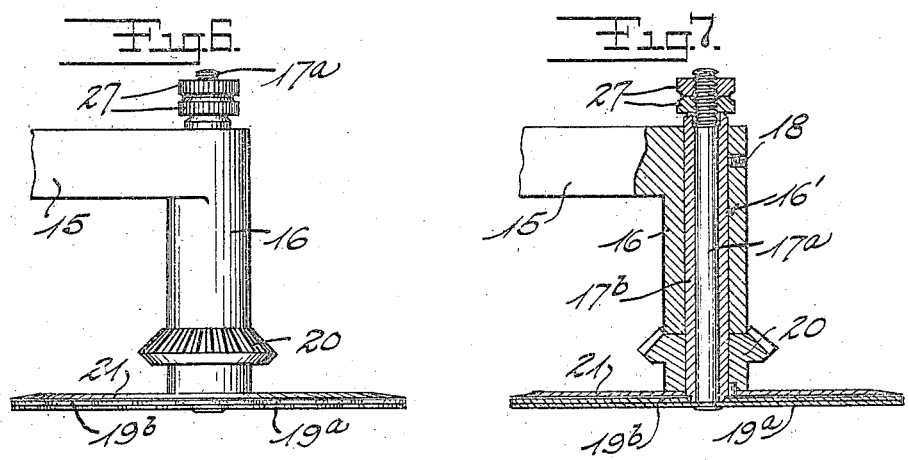

SIGMUND STEINHEIMER, OF NEW YORK, N. Y.

SKINNING-MACHINE.

1,255,657.                  Specification of Letters Patent.    Patented Feb. 5, 1918.

Application filed September 5, 1917. Serial No. 189,748.

*To all whom it may concern:*

Be it known that I, SIGMUND STEINHEIMER, a citizen of the United States of America, residing at 464 2nd avenue, city, county, and State of New York, have invented new and useful Improvements in Skinning-Machines, of which the following is a specification.

This invention relates to skinning machines, and more particularly aims to provide an improved and practical portable power-driven skinning machine having a rotary cutting blade mounted and guarded so that the machine may be used by a comparatively unskilled worker with the certainty of safety and quickly skinning a beef or the like, with the machine, nevertheless, of extremely simple, compact, reliable and sturdy construction.

In skinning beeves and the like it is frequently the case that an unskilful or even a skilful hand inadvertently pierces the skin while removing it from the knife. A skin sometimes weighs fifty pounds or more, and if cut or pierced in any single spot, every pound of the skin is salable only at a part of what such pound would otherwise sell for. As a result, numerous attempts have heretofore been made to provide a dependable skinning machine, preferably power-driven, and of the portable type, which could safely be used. Generally, a rotary cutting blade has been employed, in company with a plane or serrated guard. Where a guard having a smooth curved periphery has been provided, the periphery of the guard has been curved relative to the curve of the cutting edge of the circular knife to expose a crescent-shaped part of the blade. This arrangement, of course, has had the fatal disadvantage that the cutting blade was uncovered by the guard more or less according to the angle at which the handle of the cutting machine was directed toward the beef; the use of the machine depended largely on the skill of the workman; and at frequent intervals the skin was pierced and ruined. Of the serrated guards provided, none have been found satisfactory, because the idea has previously been that the crests of the serrations must project beyond the circular cutting edge of the knife or else must fall short of such edge.

I have discovered that if in a rotary blade skinning tool, there is provided a guard plate fixed relative to the blade and arranged alongside and close to the blade, with the guard plate having a series of edge serrations arranged in a curcumferential line with the crest of each serration exactly opposite a point on the exposed cutting edge of the rotary blade, absolutely reliable cutting may always be depended upon, and the tool may not be used to injure the skin even deliberately. Preferably, there is provided the combination of a rotary circular knife and a circular guard plate concentrically arranged with the rotary knife, the guard plate being provided with peripheral indentations and the diameter of the rotary blade being equal to the maximum diameter of the guard plate.

I have also discovered that while good results are obtained practically irrespective of the dimensions, shapes and spacings of the edge serrations of the guard plate, the spacings, at least, should be varied according to the nature of the tissue which must be cut to remove the skin from the carcass, depending on the animal which is being skinned. I have found that the tougher this tissue is, the more should be the spacings between the serrations. The operation of the cutting agent may most aptly be described as a gnawing effect.

The preferred embodiment of the invention comprises a plurality of circular guard plates concentrically arranged with the rotary blade, with both guard plates on the same side of the blade and with each guard plate provided with peripheral indentations at regular intervals, means being furnished whereby one of the guard plates may be preliminarily adjusted relative to the other, to cause the indentations on one of the plates to precisely completely overlap the indentations of the other plate, thereby to provide the widest spacings between serrations, or to caues the indentations of one of the plates to be arranged mid-way between pairs of indentations on the other plates thereby to provide the minimum spacings between serrations, or to adjust one guard plate relative to the other between these two limits, as desired.

There has also been a difficulty in the art to arrange that the cutting tool of the skinning machine act against the uncut tissue with the proper degree of pressure, and it has been found unsafe to depend on the judgment or feel of the workman. Another object of the invention is to provide an arrangement of the handle, motor, knife and knife guard, and driving means for the knife from the motor, in a machine which is motor-driven, such that the weight distribution will itself take care of applying naturally the cutting edge of the knife as regards the tissue to be cut. According to this arrangement, the motor is mounted on the handle at the outer end of the handle, and the knife is mounted on the motor at the outer end of the motor, whereby the weight of the motor pulling down on the handle will cause the cutting edge of the knife to bear with the proper pressure on the uncut flesh as the knife rotates. The preferred construction is one wherein the motor is mounted with its armature in offset prolongation of the length of an elongated handle, the handle and motor being preferably adjustable so as to dispose the handle at a slight angle to the motor shaft, as would be required by certain workers to meet certain peculiarities of habit; the knife being so mounted on the outer end of the motor that the knife is substantially in a vertical plane when the handle is grasped and held so that the motor is dependent below the handle.

The invention will be more clearly understood from the following description, when taken in connection with the accompanying drawings illustrating preferred embodiments of the invention.

In these drawings,—

Figure 1 is a bottom plan view of the machine;

Fig. 2 is a side elevation thereof;

Fig. 3 is a top plan view of the hood for the upper portions of the rotary blade and serrated guard;

Fig. 4 is an enlarged detail view, showing certain of the parts shown in Fig. 1, with the knife supporting bracket broken away to show the guard mounting;

Fig. 5 is a view, on an enlarged scale, similar to the right end of Fig. 2, showing the serrations of one guard plate adjusted relative to the other to diminish the maximum spacings between the serrations of the guard;

Fig. 6 is a top plan view of the parts shown in Fig. 5, with the hood removed; and Fig. 7 is a view generally similar to Fig. 4, but showing the details of construction of the modification of Figs. 5 and 6.

Referring to Figs. 1 to 4, the elongated handle 8 has offset therefrom a clamping plate 9 threaded for the reception as shown of a clamp screw 10 provided with a hexagonal head 11. The shank of the screw 10 passes through a suitable aperture provided in an ear 12 carried by the motor supporting strap 13. The ear 12 is shaped so as to coact with the clamping member 9, as a complementary clamping member, when the clamping screw 10 is tightened by means of its hexagonal head 11. By means of this construction the angle of the handle 8 relative to the armature of the motor 14 may be adjusted and fixed.

The motor casing has secured at its outer end a bracket 15 provided with an extension 16 bored laterally of the machine, as shown clearly in Fig. 4 at 16' to furnish a mounting for a rod 17 to be fastened tight by means of a set screw 18. One end of the rod 17 has fixedly secured thereto, by means of the riveting indicated at 17', a serrated knife guard 19. On the portion of the rod 17 which extends between the guard 19 and the adjacent end of the extension 16 of the bracket 15, is loosely mounted a beveled gear 20; and on this beveled gear is fixedly secured the rotary knife 21 by a suitable key 22.

Beveled gear 20 meshes with and is driven directly by beveled gear 23 secured to a prolongation 24 of the armature shaft of the motor 14.

A hood 25 is provided to house the upper portions of the rotary blade and the knife guard, this hood being screwed to the bracket 15 as shown most clearly in Fig. 3. The hood is also anchored in position by means of a screw 26 the threaded end of which passes through a suitable aperture in the front wall of the hood as shown in Fig. 2 and engages a suitably tapped hole in the end of rod 17 (not shown).

Referring now to Figs. 5, 6 and 7, the bracket 15 is shown as carrying a plurality of relatively adjustable guard plates, instead of the single guard plate 19. In Figs. 5, 6 and 7, one of these guard plates is marked 19$^a$ and the other 19$^b$. This arrangement differs from that shown in Fig. 4, only in that in place of the rod 17 of Fig. 4, there are provided a long rod 17$^a$ and a sleeve 17$^b$, with the rod surrounded by the sleeve and the sleeve received in the bearing 16'. The beveled gear 20 carrying the knife 21 is loosely mounted on the sleeve, while the sleeve is held fast by the set screw 18. The sleeve has riveted thereon the inner guard plate 19$^b$. The outer guard plate 19$^a$ is riveted on the outer end of the rod 17$^a$, the inner end of said rod projecting in rear of the inner end of the sleeve and being threaded so that the nuts 27 may be employed to lock the outer guard plate 19$^a$ in any selected adjustment relative to the inner guard plate 19$^b$, thereby locking both guard plates in such adjustment relative to the knife 21 when rotated with the gear 20. The screw 26 (Fig. 5) may then be set into a suitably tapped hole (not shown) in the outer end of the rod 17$^a$.

It will be observed that the maximum diameter of each of the guard plates 19, 19$^a$ and 19$^b$ is the same as the diameter of the rotary knife 21. It will also be observed that in each case the knife 21 is sharpened by being beveled only on one side, thereby to furnish a plane side against which the guard plate 19 or 19$^b$ may be closely arranged; the resulting construction, I have found, increasing the efficiency, reliability and safety of the machine.

I claim:

1. In a rotary skinning tool, the combination of a rotary blade having an exposed cutting edge, and a guard plate fixed relatively to the blade and arranged alongside and close to the blade, the guard plate having a series of edge serrations arranged in a circumferential line with the crest of each serration exactly opposite a point on the exposed cutting edge of the rotary blade.

2. In a rotary skinning tool, the combination of a rotary blade having an exposed cutting edge, and a circular guard plate provided with a circular series of marginal teeth the crest of which teeth are included in an arc having the same radius as the rotary blade.

3. In a rotary skinning tool, the combination of a rotary blade having an exposed cutting edge, a plurality of guard plates fixed relatively to the blade and arranged alongside each other and on the same side of and close to the blade, each guard plate being provided with a plurality of edge serrations arranged in a circumferential line with the crests of the serrations substantially opposite different points on the exposed cutting edge of the rotary blade, and means for adjusting one guard plate relative to the other to vary the manner of overlap of the serrations of one of the guard plates relative to the serrations of the other guard plate.

4. In a rotary skinning tool, the combination of a rotary circular knife, a plurality of circular guard plates concentrically arranged with the rotary blade with both guard plates on the same side of the blade, means whereby one of the guard plates may be preliminarily adjusted relatively to the other, and means for thereupon rotating the blade relative to the two guard plates.

5. In a rotary skinning tool, the combination of a rotary circular knife, a plurality of circular guard plates concentrically arranged with the rotary blade with both guard plates on the same side of the blade, each guard plate being provided with peripheral indentations at regular intervals, and means whereby one of the guard plates may be adjusted relatively to the other.

6. In a rotary skinning tool, the combination of a rotary circular knife, a plurality of circular guard plates concentrically arranged with the rotary blade with both guard plates on the same side of the blade, each guard plate being provided with peripheral indentations at regular intervals, and means whereby one of the guard plates may be adjusted relative to the other, the diameter of the rotary blade being equal to the maximum diameter of each guard plate.

7. In a rotary skinning tool, the combination of a rotary blade having an exposed cutting edge, said edge being provided by beveling one only of the sides of the knife so that the other side of the knife is plane, and a fixed guard plate arranged close against the plane side of the knife, the guard plate having a series of edge serrations arranged in a circumferential line with the crest of each serration exactly opposite a point on the exposed cutting edge of the rotary blade.

In testimony whereof I have signed my name to this specification.

SIGMUND STEINHEIMER.

Copies of this patent may be obtained for five cents each, by addressing the "Commissioner of Patents, Washington, D. C."